Aug. 14, 1956  M. KAHN  2,758,963
ELECTRODEPOSITION OF PLUTONIUM FLUORIDE
Filed March 24, 1945
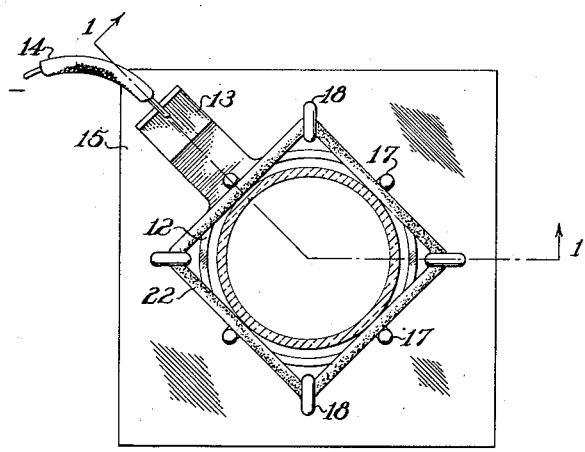
Fig. 2
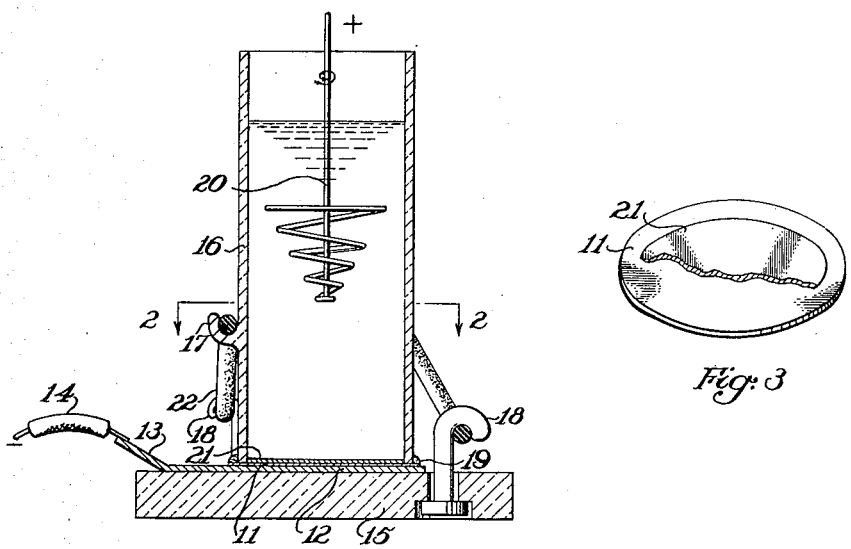
Fig. 1
Fig. 3
INVENTOR.
Milton Kahn
BY
Robert A. ———
ATTORNEY

United States Patent Office 2,758,963
Patented Aug. 14, 1956

2,758,963

ELECTRODEPOSITION OF PLUTONIUM FLUORIDE

Milton Kahn, Berkeley, Calif., assignor to the United States of America as represented by the United States Atomic Energy Commission Application March 24, 1945, Serial No. 584,687

1 Claim. (Cl. 204—56)

This invention is directed to a method of preparing uniform thin adherent foils of plutonium salts and more particularly it relates to a method of electrodepositing plutonium salts.

In order to examine materials to determine their nuclear properties, it is advantageous to have thin uniform adherent foils of the material either in elemental or compound form. Because of their chemical and physical properties, many elements cannot be conveniently prepared or retained in suitable form as elements. In such cases it is advantageous to prepare the material in suitable form as a uniform compound with elements which will not adversely affect the measurements.

It is an object of this invention to provide a process for preparing a suitably thin film of plutonium for nuclear measurements thereof.

It is another object of this invention to provide an improved process of preparing a suitably thin film of purified polyisotopic plutonium, as oxide, whereby the isotopic composition of the plutonium may be determined by nuclear measurements.

Still another object of the invention is to provide a process of electrodepositing plutonium in the form of a reduced plutonium salt film.

A further object of this invention is to provide a process for electrodepositing a sample of plutonium as a film of insoluble plutonium fluoride and igniting the plutonium fluoride to plutonium oxide to obtain a uniform film sufficiently thin that substantially no alpha particle absorption occurs therein.

In general the procedure involves the electrolysis of an aqueous solution of a soluble ionizing salt of plutonium in which salt, the more readily altered ion, can exist in another stage of oxidation, that produces an insoluble plutonous salt, the other ion being in excess in solution. For example an aqueous plutonyl fluoride solution containing an excess of fluoride ions may be electrolyzed so that an insoluble lower plutonium fluoride will be deposited as a film on the cathode. This film may be ignited to a deposit of plutonium oxide.

The foregoing example is given for purposes of illustration but is not limiting on the scope of the invention.

Additional features and advantages of the present invention will appear from the following detailed description taken in conjunction with the drawing forming part of this specification in which Figure 1 is a vertical section of the electrodeposition apparatus, Figure 2 is a horizontal sectional view taken on the line 2—2 of Figure 1 showing details of the electrodeposition cell, and Figure 3 shows a conventionalized perspective view with parts out of scale and proportion for clarity of the finished product.

In the drawing a disk 11 which is to be coated with plutonium comprises an approximately 0.002 inch platinum foil cut to a diameter of about one and one-half inches. The disk is thoroughly cleaned, ignited to red heat and tared. The disk is then ready to be assembled as part of the electrodeposition cell 10 in which the disk is to serve as the cathode upon which plutonium is to be deposited.

The above mentioned platinum disk 11 is placed on a larger and thicker platinum disk 12, which is about 0.010 inch in thickness and about two inches in diameter and which is cut so that a tab 13 extends out from the disk and makes connection with the wire 14 to which a negative potential may be applied. In turn, the platinum disk 12 is placed on the ground glass plate 15 which serves as a supporting base for the electrodeposition cell 10. The glass cylinder 16, which is provided with a suitable number (preferably four) of appendant glass hooks 17 and has an outside diameter which is a little less than one and one-half inches, is concentrically placed upon the platinum disk 11 and is secured to this position by passing a band 22 of rubber or the like alternating under the hooks 18, which are arranged in the glass plate 15, as indicated on the drawings, and over the hooks 17 of the glass cylinder 16. A liquid-tight seal is formed at the junction of glass cylinder 16 and platinum disk 11 by forming a fillet 19 of beeswax or the like around the outside of the junction. This is accomplished by applying, with a small brush, molten beeswax to the junction, the beeswax being well above its melting point in order to assure a good seal.

The anode 20 comprises an approximately nine inch length of platinum wire of one-sixteenth inch diameter of which about six and one-half inches of the length are wound in a spiral leaving about two and one-half inches of straight wire for connection to a stirrer. The platinum anode is fastened in the chuck of the small variable speed electric stirrer (not shown) and the position of this stirrer is adjusted so that the spiral anode dips about half way down into the electrodeposition cell 10, about one and one-half inches from the cathode. The anode is electrically connected so that it is at a potential positive to that of conductor 14 and is ordinarily grounded. The electrodeposition cell 10 is now completely assembled and is ready for use.

In the case where plutonium is to be deposited as plutonium tri- or tetra-fluoride on the platinum disk 11, about ten milliliters of 0.03 M sodium fluoride solution and about five milliliters of substantially pure plutonyl nitrate solution are placed in the cell. The concentration of the plutonyl nitrate solution depends on the amount of plutonium which is to be formed as a film on the platinum disk 11. Ordinarily, five milliliters of this solution is made up to contain about two hundred and fifty micrograms of plutonium which, when deposited, produces a film of a density of about thirty-one micrograms of plutonium per square centimeter. The solution, however, may contain as much as about one milligram with corresponding increase in film thickness. A potential of about seven volts is applied to the electrodeposition cell 10, whereby a current of about fifty milliamperes flows through the cell. At the same time the variable speed electric stirrer is turned on, whereby the platinum wire anode 20 is caused to rotate at a suitable speed. The action of the applied potential is to cause the plutonium as plutonyl ion, $PuO_2^{++}$ to migrate to the platinum disk 11 and be reduced to $Pu^{++++}$ or $Pu^{+++}$ ion, which combines with neighboring fluoride ions and precipitates as plutonium tetra- or tri-fluoride on the platinum disk 11.

Current is allowed to flow through the electrodeposition cell 10 until the plutonium in the cell is substantially completely deposited on the platinum disk 11. This is accomplished in about ninety minutes. After the current is turned off the solution is poured out of the cell and the cell is rinsed with water. The platinum disk 11 is then detached from the cell and again washed with water. The disk is next ignited in an oxidizing flame for about one minute, whereby any beeswax on the disk is burned off and plutonium tetra- or tri-fluoride deposit 21 is quantitatively converted to plutonous-plutonic oxide.

The platinum disk 11, accordingly, is covered with a thin uniform film of $Pu_3O_8$ and is ready for the nuclear measurement experiment.

The foregoing procedure for electrodeposition of plutonium as plutonium tri- and/or tetra-fluoride is considered to be very satisfactory but it may be modified by substituting for the fluoride ion other negative salt ions which form insoluble salts of the plutonium in a reduced state but not in the plutonyl state and which anions are less susceptible to change in the electrolysis than the plutonium ion. These anions should be in large excess over the other plutonium ions at the electrode in order to have the process effective.

The plutonium tetrafluoride deposited is exceptionally pure and is substantially free of substances which would result in an impure plutonium oxide after ignition. The method is extremely easy to carry out and requires a relatively short time.

The platinum disk supporting the thin uniform film of plutonium oxide constitutes a sample or instrument which is then utilized for the purpose of determining the isotopic composition of the plutonium by suitable measurements of fission activity and alpha activity.

In view of the foregoing, it is apparent that there has been provided an improved method for preparing plutonium in a pure form as a thin film of plutonium oxide by electrodepositing the plutonium either as plutonium tetrafluoride or other salt on a backing member, such as a thin platinum disk, and subsequently igniting the plutonium salt to plutonium oxide.

The important factor in this type of electrolysis is to keep the ratio of the concentration of the reaction material (in the case of plutonium fluoride precipitate, the plutonyl $PuO_2^{++}$ ion is reaction material) to "tying-up material" ($F^-$ ion in this case) very small so that when the changed ion ($Pu^{4+}$ or $Pu^{3+}$ ion) is produced its rate of diffusion from the electrode (in this case cathode) will be smaller than the rate of diffusion of the tying-up ion from the solution to the electrode (the $F^-$ ions to the cathode). Furthermore the precipitates formed must be stable toward further oxidation or reduction depending at which electrode it formed. It is of course necessary to maintain the pH of the solution at a value that the hydroxyl ions are not present in a quantity sufficient to cause precipitation of a hydroxide (or hydrated oxide) instead of the salt.

While there has been described what is at present considered to be preferred embodiments of the invention, it will be understood that various modifications may be made therein. Thus, for example, backing members of noble metals other than platinum, such as gold, palladium, or the like, may be used. Also, for example, soluble fluoride other than sodium fluoride may be used.

The term "plutonium" as used in the specification and claims is used generically to refer to plutonium whether in elemental or combined state except as indicated otherwise by the context.

As many widely different embodiments of this invention may be made without departing from the spirit and scope thereof, it is to be understood that the applicant does not limit himself to the specific disclosures and embodiments except as defined in the appended claim.

What is claimed is:

The process of electrodepositing plutonium fluoride from a dilute aqueous plutonyl nitrate solution containing a large excess of fluoride ions which comprises contacting at least two electrodes with a dilute aqueous solution of plutonyl nitrate and a large molar excess of fluoride ions, and passing a direct current through the solution between said electrodes at a potential of about seven volts and of a density and for a time sufficient to reduce the plutonium to an oxidation state at which it forms on the cathode an insoluble plutonium fluoride deposit.

References Cited in the file of this patent

UNITED STATES PATENTS

| 571,531 | Langhans | Nov. 17, 1896 |
| 2,059,053 | Stareck | Oct. 27, 1936 |
| 2,081,121 | Stareck | May 18, 1937 |
| 2,322,208 | Loose et al. | June 22, 1943 |
| 2,581,863 | Kahn | Jan. 8, 1952 |
| 2,608,530 | Kahn | Aug. 26, 1952 |

OTHER REFERENCES

Pierle: J. Phy. Chem. 23, pp. 517–533 (1919).

Hufford et al.: U. S. Atomic Energy Comm. Doc. No. MDDC-1515, dated Nov. 2, 1945, entitled "Techniques for the Preparation of Thin Films of Radioactive Material," pp. 31–34 (57 pp.).

Miller: U. S. Atomic Energy Comm. Doc. No. MDDC-469, declass. Oct. 24, 1946, entitled "The Electrolytic Preparation of Thin Films of Plutonium Oxide" (2 pp.).

Chem. Eng. News 24, 1193–8 (1946).